(12) United States Patent
Dolan

(10) Patent No.: US 10,517,274 B2
(45) Date of Patent: Dec. 31, 2019

(54) DOG LEASH

(71) Applicant: Dolan's Dog Doodads, LLC, Seattle, WA (US)

(72) Inventor: Mary R. Dolan, Seattle, WA (US)

(73) Assignee: Dolan's Dog Doodads, LLC, Seattle, WA (US)

( * ) Notice: Subject to any disclaimer, the term of this patent is extended or adjusted under 35 U.S.C. 154(b) by 169 days.

(21) Appl. No.: 15/605,379

(22) Filed: May 25, 2017

(65) Prior Publication Data

US 2017/0347631 A1    Dec. 7, 2017

Related U.S. Application Data

(60) Provisional application No. 62/344,788, filed on Jun. 2, 2016.

(51) Int. Cl.
*A01K 27/00* (2006.01)

(52) U.S. Cl.
CPC .......... *A01K 27/005* (2013.01); *A01K 27/003* (2013.01)

(58) Field of Classification Search
CPC ... A01K 27/005; A01K 27/003; A01K 27/002
See application file for complete search history.

(56) References Cited

U.S. PATENT DOCUMENTS

| 4,763,609 A * | 8/1988 | Kulik | A01K 27/003 119/797 |
| 5,551,379 A * | 9/1996 | Hart | A01K 27/003 119/771 |
| 6,971,334 B1 * | 12/2005 | Livesay | A01K 27/003 119/792 |
| 8,327,808 B2 * | 12/2012 | Chirico | A01K 27/003 119/792 |
| 2012/0260865 A1 * | 10/2012 | Nesper | A01K 27/00 119/792 |
| 2013/0167782 A1 * | 7/2013 | Poch | A01K 27/003 119/795 |
| 2014/0083371 A1 * | 3/2014 | McCrocklin | A01K 27/001 119/795 |
| 2014/0331944 A1 * | 11/2014 | Chirico | A01K 27/003 119/797 |
| 2017/0064928 A1 * | 3/2017 | Seuk | A01K 27/003 |
| 2017/0360009 A1 * | 12/2017 | Anderson | A01K 27/008 |
| 2018/0368356 A1 * | 12/2018 | Case | A01K 1/064 |

* cited by examiner

*Primary Examiner* — Trinh T Nguyen
(74) *Attorney, Agent, or Firm* — Seed IP Law Group LLP

(57) ABSTRACT

A reconfigurable leash is provided. The reconfigurable leash allows a user to configure the leash in multiple configurations, including hand-free, single animal, double animal, and tether configurations. The leash includes a body having two ends and couplings located at each end. The leash also includes three rings located at three different positions along the length of the body. The leash also includes a moveable pad that wraps around a portion of the body of the leash.

12 Claims, 7 Drawing Sheets

DOG LEASH

CROSS-REFERENCE TO RELATED APPLICATIONS

This application claims the benefit of U.S. provisional patent application No. 62/344,788, filed Jun. 2, 2016, which is incorporated herein by reference in its entirety.

BACKGROUND

Technical Field

This disclosure generally relates to animal leashes and more specifically to adjustable dog leashes.

Description of the Related Art

Animal leashes come in a variety of shapes and sizes. Generally, a leash is made from a woven fabric or chain material. A leash generally also includes a handle for a person to hold onto with their hand on one end while the other end is configured to attach to an animal, for example, to a collar or harness on an animal. Such a leash is capable of walking a single dog.

Some leashes have a single handle that is coupled to independent two pieces of woven fabric or chain material. Each length of woven fabric or chain material may include a coupling or snap for connection to an animal. Such a leash is suitable for walking two dogs.

Some dog harnesses have a single coupling point, such as a standard dog collar, while some dog harnesses have two coupling points, such as the so-called "no-pull" dog harnesses.

Some dogs are easily controlled and obedient when walked, while other dogs require much more control and correction to keep them heeled. Some dogs may be easily heeled in some situations while in others they need more control and correction. Easily controlled dogs may be walked with an over-the-shoulder, hands-free leash while they require little to no correction, while at other times the dogs may need the near constant control and correction that a hand leash enables.

If a person wishes to walk one dog at time and two dogs at other times, or has some animals with a single point harness and other animals with a double point harness, or needs varying amounts of control of the animal in different situations, the person may need to have three, four, or even five leashes to properly handle each situation they and the animal or animals may encounter.

In some situations they may be out with one type of leash, such as a hand-held leash, and find that circumstances have changed such that they need an over-the-shoulder, hands-free leash, but do not have one on hand.

BRIEF SUMMARY

According to one embodiment disclosed herein, a reconfigurable leash is provided. The reconfigurable leash allows a user to configure the leash in multiple configurations, including hands-free, single animal, double animal, and tether configurations. The leash includes a body having two ends and couplings located at each end. The leash also includes three rings located at three different positions along the length of the body. The leash also includes a moveable pad that wraps around a portion of the body of the leash.

According to another embodiment, a method of manufacturing a leash is provided. The method includes affixing a first coupling at a first end of a body of material and affixing a second coupling at a second end of the body of material. The method also includes affixing a first ring to the body of material between the first coupling and the second coupling, affixing a second ring to the body of material between the first ring and the first coupling, and affixing a third ring to the body of material between the first ring and the second coupling. The method also includes forming a moveable pad having a first end, a second, and an aperture extending through the moveable pad between the first end and the second end and passing a portion of the body of the leash through the aperture of the moveable pad.

According to yet another embodiment, an animal leash is provided. The animal leash includes a first webbing and a second webbing. The first and second webbing being sewn together to form a cord along at least a portion of their respective lengths, the cord having a first end and a second end. The leash also includes a first coupling sewn to the cord at the first end of the cord and a second coupling sewn to the cord at the second end of the cord. The leash also includes a first ring sewn to the cord at a first location between the first end of the cord and the second end of the cord, a portion of the first ring being positioned between the first webbing and the second webbing, a second ring sewn to the cord at a second location between the first end of the cord and the first ring, a portion of the first ring being positioned between the first webbing and the second webbing, and a third ring sewn to the cord at a third location between the second end of the cord and the first ring, a portion of the first ring being positioned between the first webbing and the second webbing. The leash also includes a moveable pad having a first end, a second end, and an aperture extending through the moveable pad between the first end and the second end, a portion of the cord being within the aperture of the moveable pad, the moveable pad being moveable between a first location on the cord and a second location on the cord.

DETAILED DESCRIPTION

Figure 1:
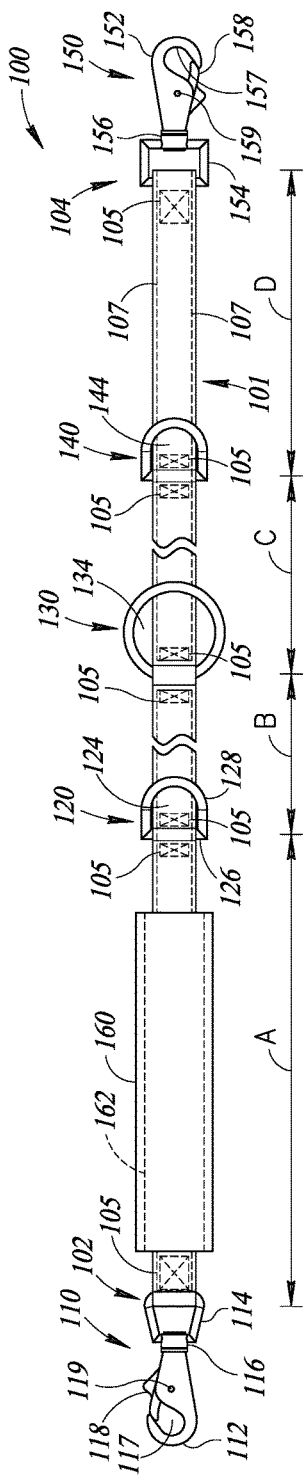
FIG. 1 is a top view of a leash according to one embodiment of the present disclosure.
Figure 2:
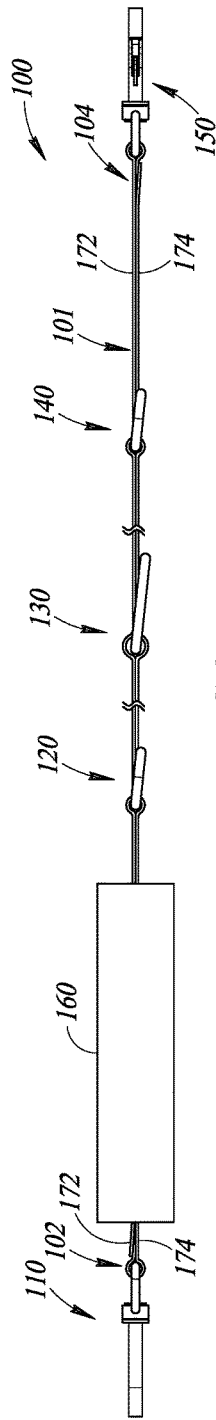
FIG. 2 is a side view of the leash of FIG. 1.

FIGS. 1 and 2 show an embodiment of an adjustable leash 100 that has a first end 102 configured with a first coupling 110 and a second end 104 configured with a second coupling 150. Between the first end 102 and the second end 104, the leash includes a movable pad 160 and multiple rings 120, 130, and 140 at fixed locations along the length of the leash 100.

The coupling 110 at the first end 102 of the leash 100 is a push operated swivel snap coupling. In other embodiments, other types of couplings may be used. For example, the coupling 110 may also be a trigger snap, a bolt snap, a spring hook, a lobster claw bolt snap hook, or other types of couplings. The coupling 110 includes a tapered swivel head 114, also called a semi-square swivel head, configured to be coupled to the body 101 of the leash 100, sometimes also referred to as the cord. The swivel head 114 is coupled to a hook 112 via a swivel 116. In some embodiments, the swivel 116 may be omitted.

Figure 3:
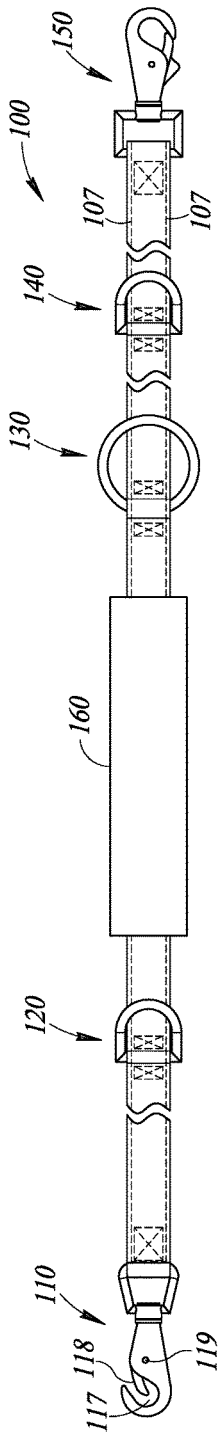
FIG. 3 is a top view of the leash of FIG. 1, with the handle in a second position.

The hook 112 includes a gate 118 that is pivotally mounted to the hook 112 via a pin 119. The hook 112 and gate 118 form an aperture 117 though the body of the hook 112. In FIG. 1, the coupling 110 is shown with the gate 118 and the aperture 117 in a closed position. FIG. 3 depicts an example of the coupling 110 with the gate 118 and the aperture 117 in an open position.

Figure 5:
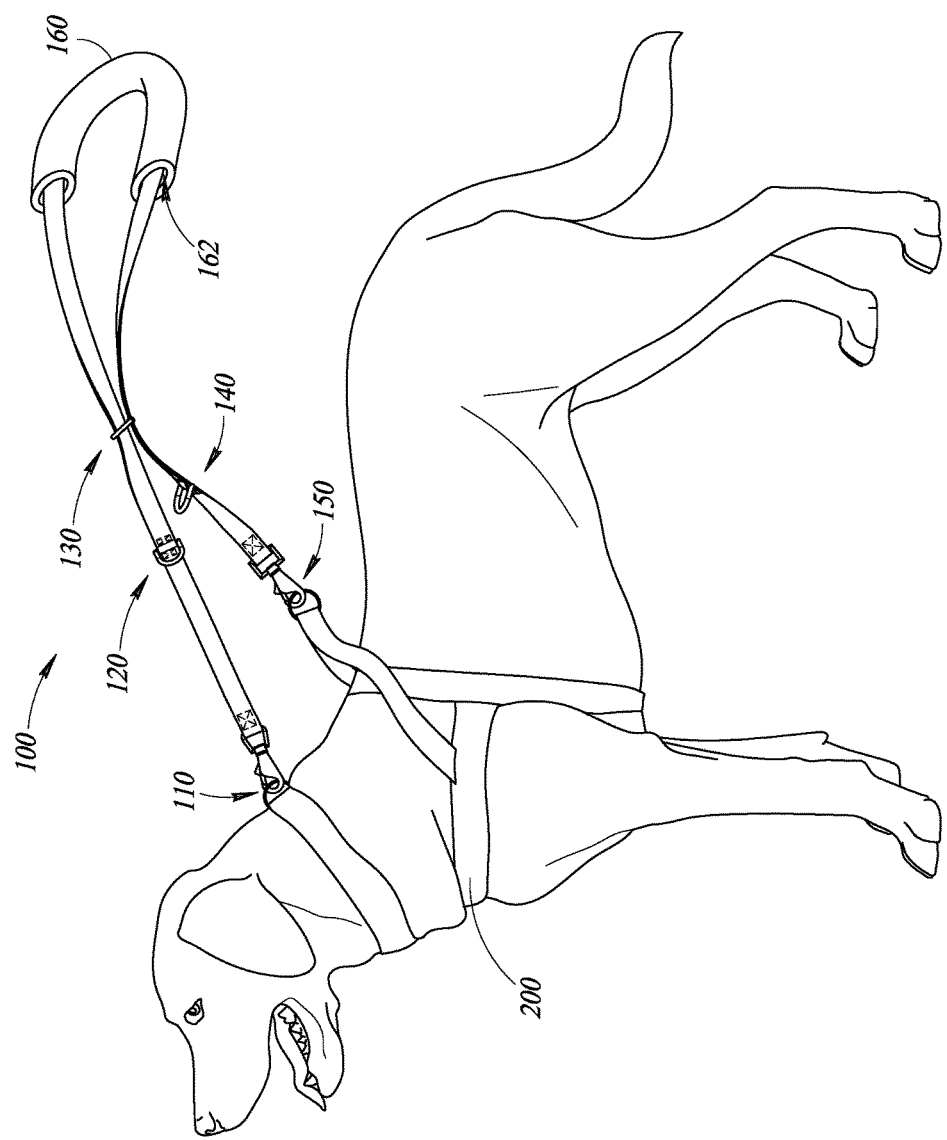
FIG. 5 shows the leash of FIG. 1 in use in the double harness configuration of FIG. 4.
Figure 7:
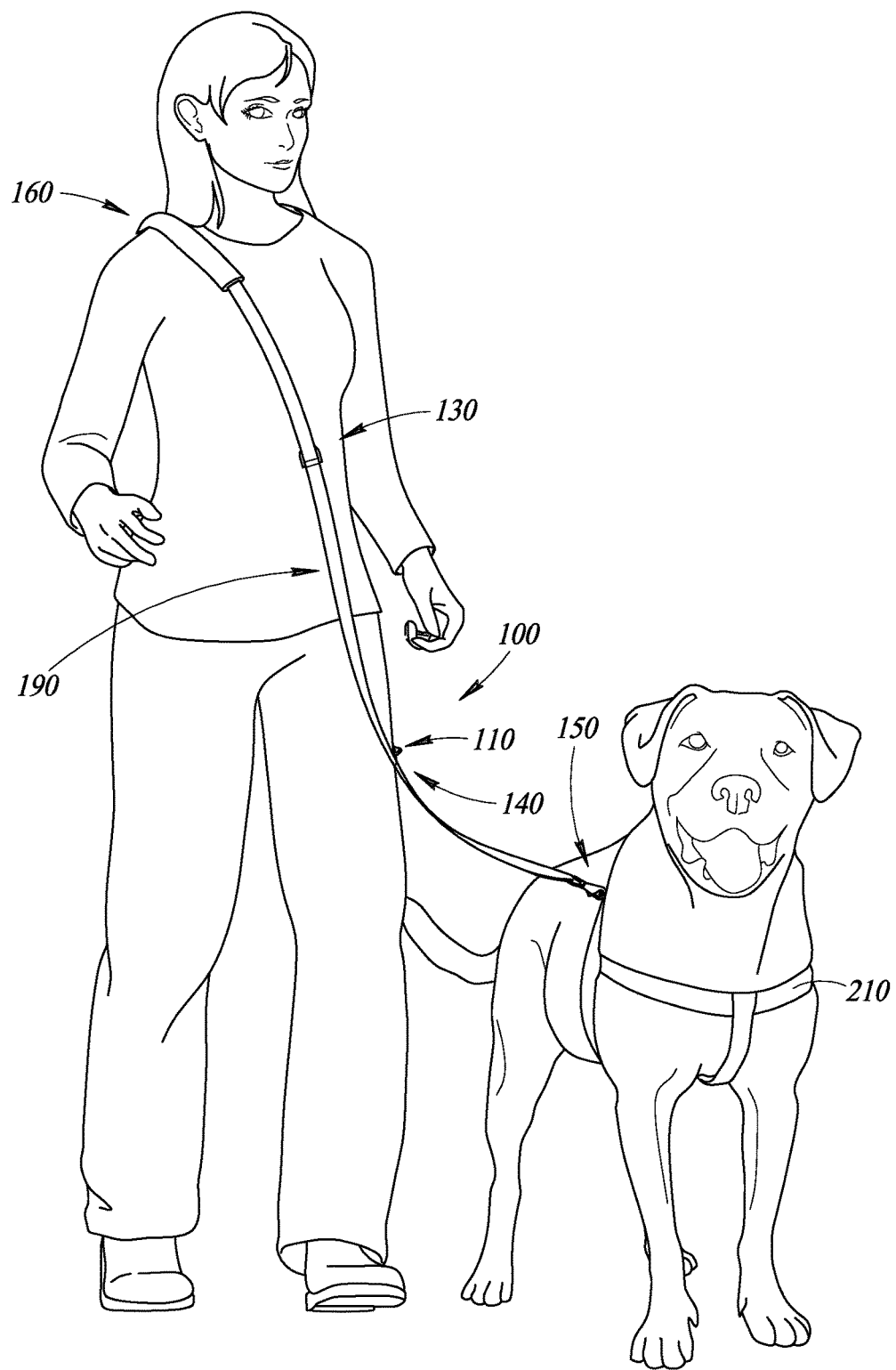
FIG. 7 shows the leash of FIG. 1 in use in the over-the-shoulder configuration of FIG. 6.

The coupling 110, including the hook 112, aperture 117, and gate 118, is sized and shaped such that the coupling 110 may be coupled to an animal harness, for example, an animal harness 200 of FIG. 5 or an animal harness 210 of FIG. 7, or to the rings 120, 130, and 140. In addition, the coupling 110, and in particular its tapered swivel head 114, is configured such that the coupling 110 may pass though an aperture 134 of the ring 130, but may not pass through apertures 124, 144 of the rings 120, 140.

Figure 6:
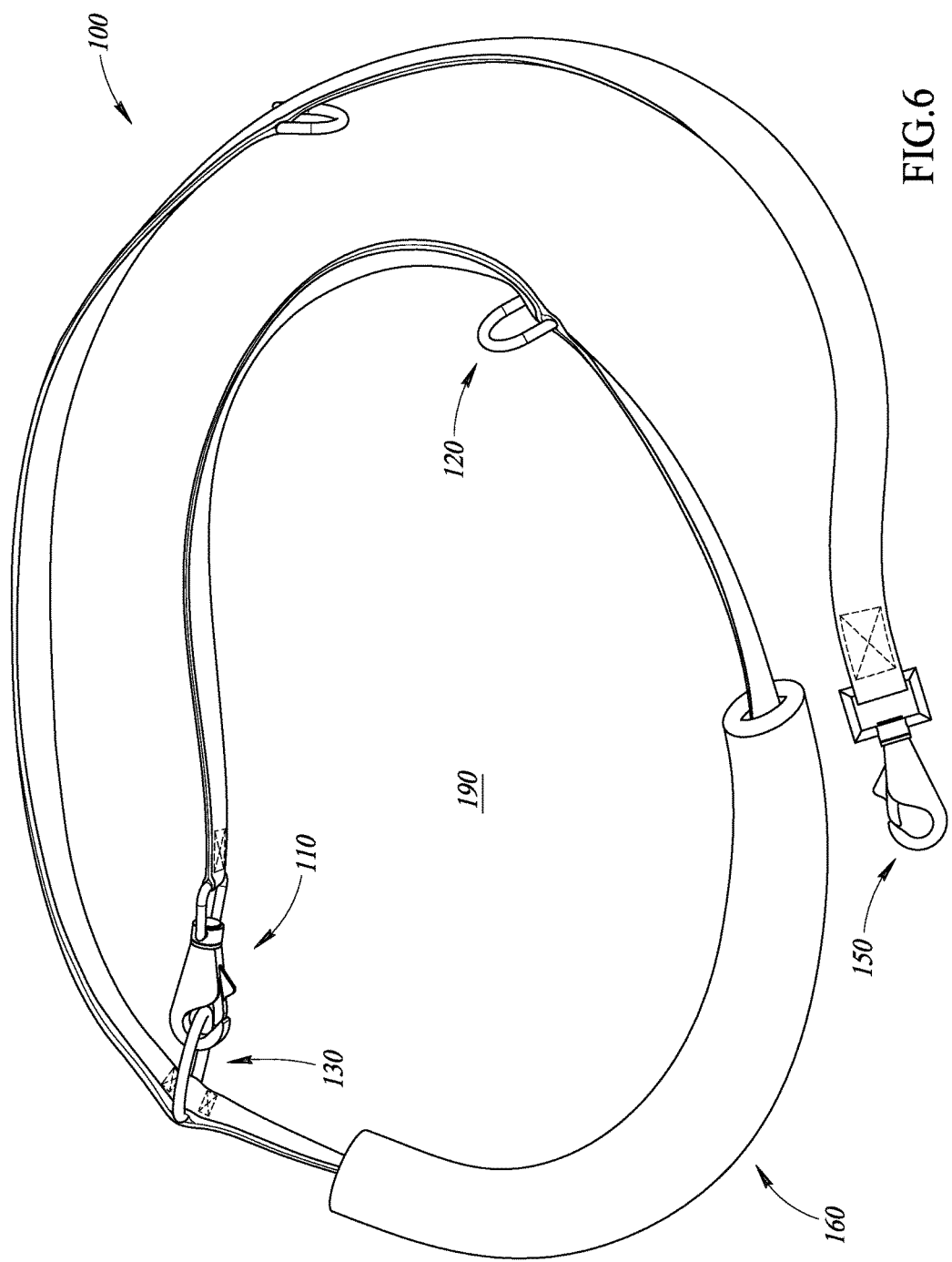
FIG. 6 shows the leash of FIG. 1 configured for over-the-shoulder use.

As shown in FIG. 1, the leash 100 includes the moveable pad 160. The moveable pad 160 may be formed from 3-mil double jersey sided neoprene sewn into a tube shape having an inner aperture 162 that extends along the length of the moveable pad 160. The moveable pad 160 provides the leash 100 with a comfortable, cushioned handle by which a user may grip the leash 100. In some embodiments, the moveable pad 160 is a shoulder pad that aids in cushioning the user's shoulder from the body 101 of the leash 100, for example, as shown in FIGS. 6 and 7.

The aperture 162 of the moveable pad 160 is sized and shaped such that the moveable pad may slide over the body 101 of the leash 100 and the ring 120, but resists or is incapable of being slid over the ring 130. FIG. 3 shows an embodiment of the leash 100 configured with the moveable pad 160 positioned between the ring 120 and the ring 130, after the moveable pad 160 has been slid over the ring 120.

The ring 120 may be a D-shaped ring, having a straight portion 126 and a rounded portion 128. Such a ring is commonly referred to as a D-ring. The ring 120 is pivotably secured to the body 101 of the leash 100 by stitching two box-x stitching patterns 105 on either side of the ring 120. The ring 120, although substantially affixed to the body 101 of the leash 110 in a fixed location, may pivot about its straight portion 126.

The ring 130 may be an O-shaped ring having the shape of an annulus. Such a ring is commonly referred to as an O-ring. The ring 130 is pivotably secured to the body 101 of the leash 100 by stitching two box-x stitching patterns 105 on either side of the ring 130. The ring 130, although substantially affixed to the body 101 of the leash 100 in a fixed location, is pivotable.

The ring 140 may be substantially similar to the ring 120. The ring 140 may also be a D-shaped ring, having a straight portion 146 and a rounded portion 148. The ring 140 is also pivotably secured to the body 101 of the leash 100 by stitching two box-x stitching patterns 105 on either side of the ring 140. The ring 140, although substantially affixed to the body 101 of the leash 100 in a fixed location, may pivot about its straight portion 146.

The coupling 150 at the second end 104 of the leash 100 is a push operated swivel snap coupling. In other embodiments, other types of couplings may be used. For example, the coupling 150 may also be a trigger snap, a bolt snap, a spring hook, a lobster claw bolt snap hook, or other types of couplings. The coupling 150 includes a square swivel head 154 configured to be coupled to the body 101 of the leash 100. The swivel head 154 is coupled to a hook 152 via a swivel 156. In some embodiments, the swivel 156 may be omitted.

The hook 152 includes a gate 158 that is pivotally mounted to the hook 152 via a pin 159. The hook 152 and gate 158 form an aperture 157 though the body of the hook 152.

The coupling 150, including the hook 152, aperture 157, and gate 158, is sized and shaped such that the coupling 150 may be coupled to an animal harness, for example, the animal harness 200 of FIG. 5 or the animal harness 210 of FIG. 7, or to the rings 120, 130, and 140. In addition, the coupling 150, and in particular, the square swivel head 154 is configured such that it may not pass though the apertures 124, 134, 144 of the rings 120, 130, 140 or resists being passed through the apertures 124, 134, 144 of the rings 120, 130, 140

By configuring the coupling 110 at one end of the leash 100 such that it may pass through some but not all of the apertures 124, 134, 144 of the rings 120, 130, 140, while configuring the coupling 150 at the other end such that it does not pass through any of the apertures 124, 134, 144 of the rings 120, 130, 140, the leash 100 itself aids in preventing the user from incorrectly configuring the leash, because only one of the couplings 110 may pass through any of the rings 120, 130, 140.

As shown in the side view of the leash 100 in FIG. 2, the body 101 of the leash 100 includes two pieces of webbing 172, 174 stitched together with stitching 107 (see FIGS. 1 and 3) sewn along the sides of the body 101 of the leash 100. The couplings 110 and 150 are sewn to the body 101 of the leash 100 by passing a portion of a first of the webbings 172, 174 though the swivel heads 114, 154 and then folding over about 1 to 1.5 inches of the one of the webbings 172, 174. The other of the webbings 172, 174 is then placed over the folded-over portion of the first of the webbings 172, 174 and a box-x stitching pattern is sewn through the three layers of webbings 172, 174.

The leash 100 may be made in many different lengths and widths. For example, the overall length of the leash 100 may be either 7 feet or 8 feet and the width of the body 101 of the leash 100 may be ⅝ inch or ¾ inch. A shorter, thinner leash body 101 is better suited for smaller animals, while a longer, wider leash body 101 may be better suited for larger animals. The construction of both lengths is similar.

In one embodiment of a 7-foot leash 100, the coupling 110 may be a ½-inch snap with a round or D-shaped swivel head 114, ring 120 may be a ⅝-inch D-ring, ring 130 may be a 1-inch O-ring, ring 140 may be a ⅝-inch D-ring, and coupling 150 may be a ⅝-inch snap with a tapered swivel head 154.

In one embodiment of an 8-foot leash 100, the coupling 110 may be a ⅝-inch snap with a tapered swivel head 114, ring 120 may be a ⅝-inch D-ring, ring 130 may be a 1-inch O-ring, ring 120 may be a ¾-inch D-ring, and coupling 150 may be a ¾-inch snap with a straight swivel head 154.

With reference to FIG. 1, in manufacturing both the 7-foot and 8-foot embodiments, the ring 120 may be affixed at a location on the body 101 of the leash 100 about 14 inches from the first end 102 of the body 101 of the leash 100, such that a length A is about 14 inches. The ring 140 may be affixed at a location on the body 101 of the leash 100 of about 17 inches from the second end 104 of the body 101 of the leash 100, such that a length D is about 17 inches. The ring 130 may be affixed at a location on the body 101 of the leash 100, between the ring 120 and the ring 140, about 14.5 inches farther down from the ring 140, such that a length C is about 14.5 inches. Thus, in an embodiment of a 7-foot leash, a length B is about 3 feet and in an embodiment of an 8-foot leash, the length B is about 4 feet.

In manufacturing the leash 100, the first coupling 110 is placed on the second webbing 174 and about 1.25 inches of the end of the second webbing 174 is passed though the swivel head 114 and folded over onto itself. The first webbing 172 is then butted up to the swivel head 114 and covering up the end of the second webbing 174. A tackdown stitch or box-x stitch 105 may be used to keep the webbing and coupling 110 in place. The sides of the first and second webbing 172, 174 are then stitched together from the first end 102 to the location of the ring 120 with stitches 107.

The ring 120 is positioned on the first or second webbing 172, 174, and the first and second webbing 172, 174 are sewn along their sides down to the position of the ring 130. The ring 130 is positioned on the first or second webbing 172, 174, and the first and second webbing 172, 174 are sewn along their sides down to the position of the ring 140 with stitches 107.

The coupling 150 is placed on the first webbing 172 and about 1.25 inches of the end of the first webbing 172 is passed though the swivel head 154 and folded over onto itself. The second webbing 174 is then butted up to the swivel head 154, covering up the end of the first webbing 172. The final section of the two pieces of webbing 172, 174, between the ring 140 and the coupling 150, is then sewn down the sides with stitches 107.

A box-x sewing pattern 105 is then stitched in eight places along the leash 100, at the first end 102 to securely hold the coupling 110, the second end 104 to securely hold the coupling 150, and on both sides of the rings 120, 130, 140 to securely hold the rings 120, 130, 140 in their respective positions.

The moveable pad 160 may be formed from 3-mil double sided jersey neoprene. The neoprene may be cut into a rectangle measuring about 2.5 inches by about 13.25 inches. The ends of the neoprene may be sealed with seam sealing tape, such as iron-on neoprene seam sealing tape. The neoprene is then folded over along its 13.25 inch length and the long sides of the neoprene are sewn together, forming a tube. The moveable pad 160 is then turned right-side out.

The moveable pad 160 is then slipped onto the body 101 of the leash 100 by passing the moveable pad 160 over the coupling 110 until it is positioned between the coupling 110 and the ring 120. The leash 100 is now ready for use. The length of the moveable pad 160 is less than the length A of the body 101 of the leash 100.

Figure 4:
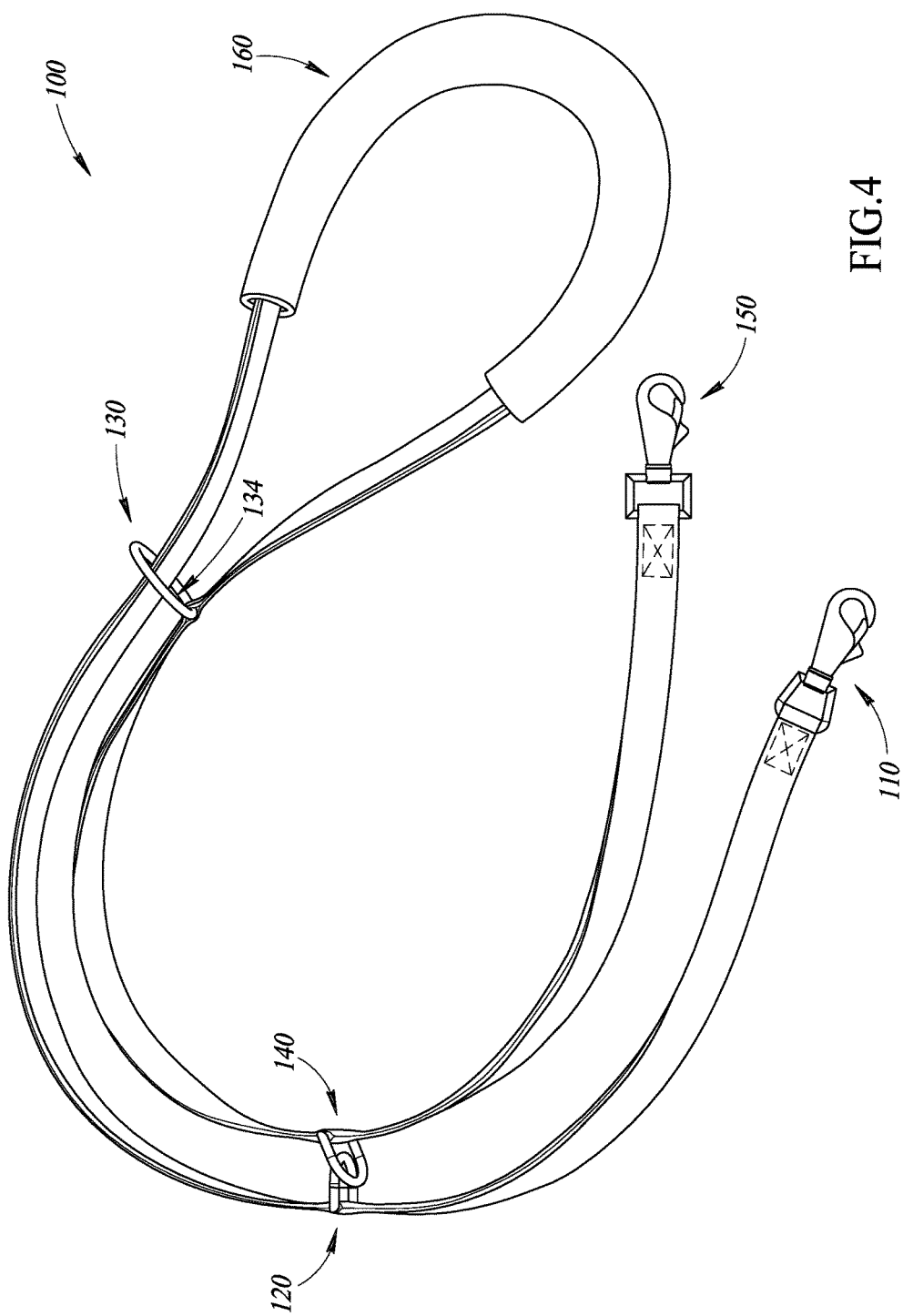
FIG. 4 shows the leash of FIG. 1 configured for walking two dogs or for a double harness.

FIGS. 4 and 5 show the leash 100 in a double leash or European leash configuration. In this configuration, the moveable pad 160 is moved from being between the coupling 110 and the ring 120 to be between the ring 120 and the ring 130. The coupling 110 and the ring 120, along with a portion of the body of the leash are then passed though the aperture 134 of the ring 130.

In the double leash configuration, each of the couplings 110, 150 may be coupled to the harness or collar of a different animal. In the European leash configuration, each of the couplings 110, 150 is coupled to different points on the harness 200 of the same animal, for example, as shown in FIG. 5.

FIGS. 6 and 7 show the leash 100 in an over-the-shoulder configuration. In this configuration, the moveable pad 160 is moved from being between the coupling 110 and the ring 120 to be between the ring 120 and the ring 130, and the coupling 110 is coupled to the either the ring 130 or the ring 140 forming an aperture 190.

In use, for example as shown in FIG. 7, one arm and the head of the user is passed though the aperture 190 and the moveable pad 160 rests on the user's shoulder while the coupling 150 is coupled to the collar or harness 210 of the animal.

Figure 8:
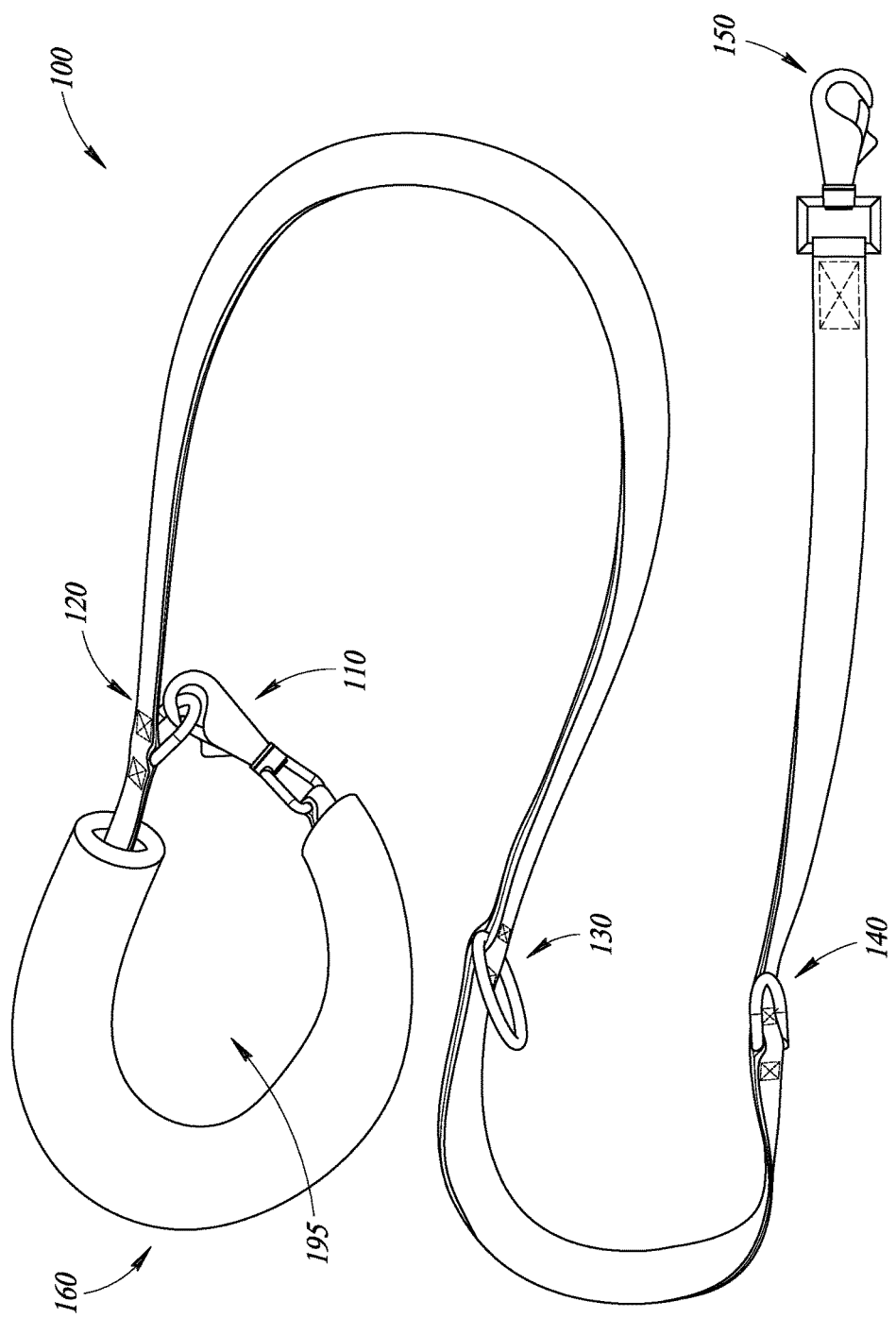
FIG. 8 shows the leash of FIG. 1 configured as a hand-held leash.

FIG. 8 shows the leash 100 in a hand-held configuration. In this configuration, the moveable pad 160 remains between the coupling 110 and the ring 120, and the coupling 110 is coupled to the ring 120. This forms an aperture 195 that is smaller than the aperture 190 and is sized and shaped for being gripped by a user's hand.

In use, the user holds onto the leash 100 by gripping the moveable pad 160 and the coupling 150 is coupled to a collar or harness of an animal.

Figure 9:
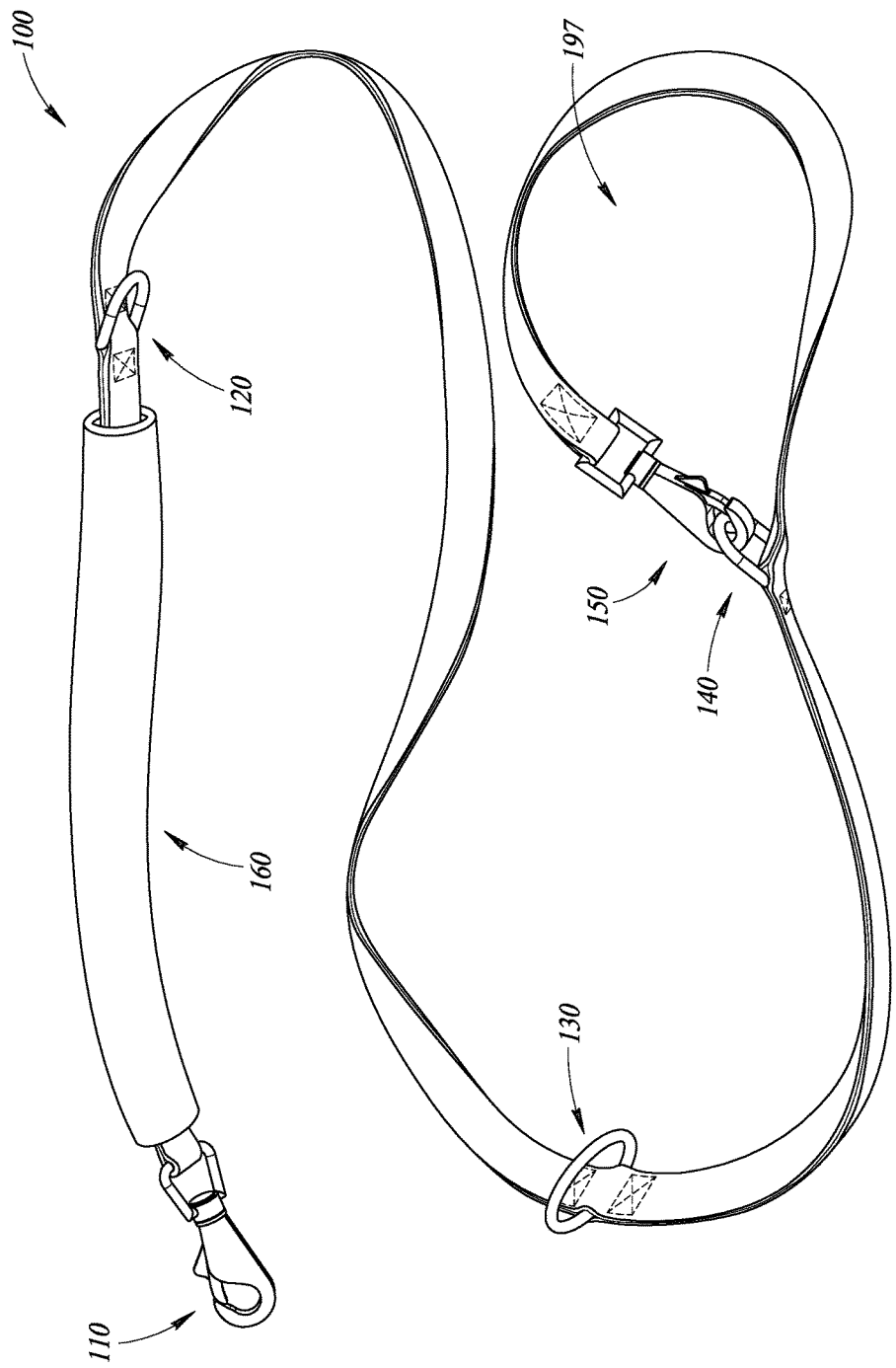
FIG. 9 shows the leash of FIG. 1 configured as a tether.

FIG. 9 shows the leash 100 in a tether configuration. In this configuration, the moveable pad 160 remains between the coupling 110 and the ring 120, and the coupling 110 is coupled to the ring 140 to form an aperture 197 around a fixed object, for example a fence post, table leg, or another object.

In use, coupling 110 is coupled to the collar or harness of the animal while the other end of the leash 100, in particular the aperture 197, is secured to a fixed object.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An animal leash, comprising:
   a body extending between first and second ends;
   a first coupling affixed to the first end of the body;
   a second coupling affixed to the second end of the body;
   a first ring affixed to the body between the first coupling and the second coupling;
   a second ring affixed to the body between the first ring and the first coupling;
   a third ring affixed to the body between the first ring and the second coupling; and
   a movable pad extending along and surrounding a portion of the body and being moveable between a first location on the body between the first coupling and the second ring and a second location on the body between the first ring and the second ring.

2. The animal leash of claim 1, wherein:
   the first ring is an o-ring and the second and third rings are d-rings.

3. The animal leash of claim 1, wherein:
   the first coupling has a first size and shape and the second coupling has a second size and shape.

4. An animal leash, comprising:
a body extending between first and second ends;
a first coupling affixed to the first end of the body;
a second coupling affixed to the second end of the body;
a first ring affixed to the body between the first coupling and the second coupling;
a second ring affixed to the body between the first ring and the first coupling;
a third ring affixed to the body between the first ring and the second coupling; and
a movable pad extending along and surrounding a portion of the body and being moveable between a first location on the body and a second location on the body, and
wherein an aperture of the first ring is sized and shaped to receive the first coupling therethrough and the second ring therethrough and resist the second coupling from passing through the aperture of the first ring.

5. The animal leash of claim 4, wherein:
an aperture of the second ring is sized and shaped to resist the first and second coupling from passing therethrough.

6. The animal leash of claim 1, wherein:
the body of the leash extending between the first coupling and the second ring defines a first length, the moveable pad having a second length that is less than the first length.

7. An animal leash, comprising:
a first webbing;
a second webbing, the first and second webbing being sewn together along at least a portion of their respective lengths to form a cord, the cord having a first end and a second end;
a first coupling sewn to the cord at the first end of the cord;
a second coupling sewn to the cord at the second end of the cord;
a first ring sewn to the cord at a first location between the first end of the cord and the second end of the cord, a portion of the first ring being positioned between the first webbing and the second webbing;
a second ring sewn to the cord at a second location between the first end of the cord and the first ring, a portion of the first ring being positioned between the first webbing and the second webbing;
a third ring sewn to the cord at a third location between the second end of the cord and the first ring, a portion of the first ring being positioned between the first webbing and the second webbing; and
a moveable pad having a first end, a second end, and an aperture extending through the moveable pad between the first end and the second end, a portion of the cord being within the aperture of the moveable pad, the moveable pad being moveable between a first location on the cord and a second location on the cord.

8. The animal leash of claim 7, wherein:
the first ring is an o-ring and the second and third rings are d-rings.

9. The animal leash of claim 7, wherein:
the first coupling is sized and shaped to pass through an aperture of the first ring and the second coupling is sized and shaped to resist passing though the aperture of the first ring.

10. The animal leash of claim 7, wherein:
the second ring is sized and shaped to pass through an aperture of the first ring.

11. The animal leash of claim 7, wherein:
the first and second couplings are swivel snap couplings.

12. The animal leash of claim 7, wherein:
the first coupling includes a tapered swivel head.

* * * * *